Feb. 15, 1949. W. ARMSTRONG 2,461,799
METHOD OF DETECTING AND MEASURING RADIANT ENERGY
FOR LOCATING SUBTERRANEAN PETROLEUM DEPOSITS
Filed Aug. 3, 1944
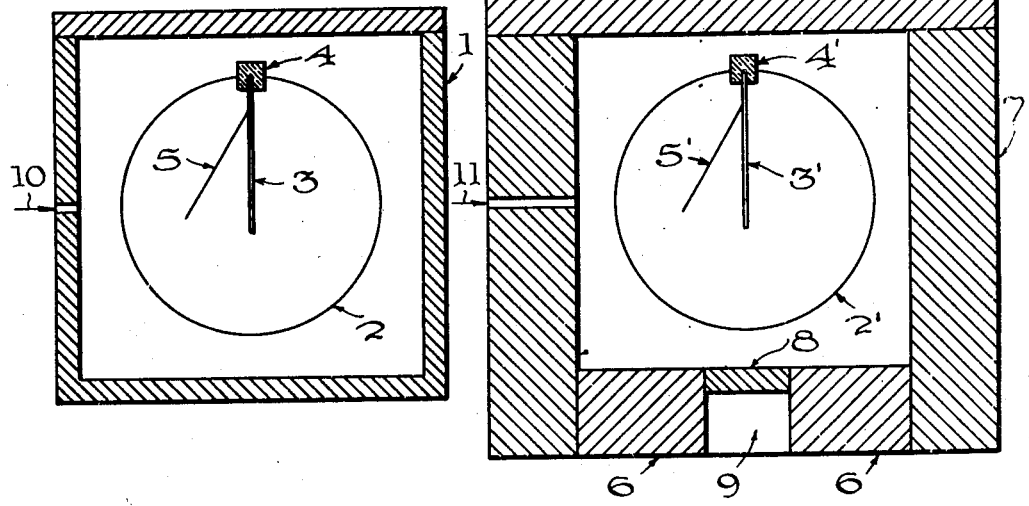
Inventor
Walter Armstrong Patented Feb. 15, 1949

2,461,799

UNITED STATES PATENT OFFICE 2,461,799

METHOD OF DETECTING AND MEASURING RADIANT ENERGY FOR LOCATING SUB-TERRANEAN PETROLEUM DEPOSITS

Walter Armstrong, Washington, D. C.

Application August 3, 1944, Serial No. 547,940

6 Claims. (Cl. 250—83.6)

This invention relates to geophysical prospecting and more particularly to the determination at points on the earth's surface of the presence of petroleum beneath the surface of the earth. The invention provides a method of detecting and measuring radiant energy for locating subterranean petroleum deposits by the detection and measurement of relative values of the radiant energy emanating from the petroleum deposits.

In the art of geophysical prospecting various electrical, physical and chemical methods have been employed to ascertain the formation and nature of the geophysic and stratigraphic structure beneath the surface of the earth. Apparatus and methods have been developed to obtain indications of subterranean petroleum but the use of such apparatus is limited to excavations or drill holes. Surface methods of geophysical prospecting, with the exception of soil and gas analysis and other chemical or petrographic methods, indicate more or less directly the presence of geological conditions in which petroleum is expected to occur. Methods utilizing radioactivity have been used at the earth's surface for the identification of outcropping or shallow rock. No method now employed embraces the direct indication at the earth's surface of subterranean deposits of petroleum.

This invention involves the discovery that subterranean petroleum deposits emit penetrating radiant energy in amounts proportionate to the nature and quantity of the petroleum and that the penetrating radiations from subterranean petroleum deposits will pass through intervening rock strata to the surface of the earth.

Full determination as to all of the physical properties of this radiant energy has not been completed but field tests in various parts of the United States have definitely established its existence and reproducible measurements have been made of oil producing areas which check with known conditions.

My method for detecting and measuring the penetrating radiant energy emanating from subterranean deposits of petroleum and reaching the earth's surface is essentially different in principle and operation from other methods of measuring known radiations. The practice of this invention resides upon the fact that the radiant energy emanating from subterranean petroleum deposits will cause negative charges to be added to the walls of an ionization chamber when properly shielded from other radiations if the inner surface of the ionization chamber has been given an initial electrostatic negative charge. This addition of charges on the inner surface of the ionization chamber causes corresponding charges of opposite polarity to be created on the ionization chamber electrode. It is therefore only necessary to ascertain the extent of the additional charges created upon the electrode or upon the inner surface of the ionization chamber for locating subterranean petroleum deposits.

The initial negative charge is placed on the inner surface of the ionization chamber by charging the electrode in the ionization chamber with a positive electrostatic charge which, in accordance with the accepted theory, causes corresponding charges of opposite polarity to be created on the inner surface of the ionization chamber.

The ionization chamber may follow the general construction of any type of electroscope, electrometer, or other current or voltage measuring device. Should equipment be used embracing an ionization chamber of multiple plate wall construction or should the electrode therein be of multiple plate construction, the polarity of the initial electrode charge may not of necessity be positive.

Ionization chambers of various forms have been used in geophysical prospecting of the earth's structure but all such ionization chambers are used to measure or indicate the loss of the electrode charge or the increase in conduction of electrical current through the ionization chamber. My use of the ionization chamber is for an entirely different purpose. I use the ionization chamber when shielded from known earthly ionizing radiations such as alpha, beta and gamma and other unwanted ionizing radiations, to permit the accumulation of electrical charges on the inner surface of the chamber.

When prospecting for subterranean deposits of petroleum the ionization chamber and electrode therein are shielded from known earthly ionizing radiations such as alpha, beta, gamma and other unwanted ionizing radiations observed associated with the radiant energy emanating from subterranean petroleum deposits yet permitting the radiant non-ionizing energy emanating from subterranean petroleum deposits to penetrate to the ionization chamber in sufficient quantity to be detected and measured. When making vertical detections and measurements of the radiant energy emanating from a subterranean petroleum deposit, the ionization chamber and electrode therein are shielded against earthly electrical radiation, all or in part, on all sides except a portion of the side between the ionization chamber and the earth's surface, which excepted portion of the bottom shielding permits penetration to the ionization chamber of the radiant energy emanating from a restricted portion of the earth's substrata in sufficient quantity for its detection and measurement.

Normally in the absence of radiant energy penetrating to the ionization chamber the electrode charge dissipates, that is loses its charge, at a normal rate fixed by and dependent on the construction of the ionization chamber and the insulation around the ionization chamber electrode. Known earthly electrical radiations accelerate the rate of dissipation of the electrode charge. It is the retardation of the dissipation of the electrode charge over a definite time period or scale unit that makes the detection and measurement on the surface of the earth of the penetrating radiant energy emanating from subterranean petroleum deposits possible.

The principal object of this invention is to provide a method for obtaining a direct indication on the surface of the earth of subterranean deposits of crude petroleum. Another object of this invention is to provide a method for obtaining the measurement of the radiant energy emanating from subterranean petroleum deposits for use in determining the source of greatest energy radiation to ascertain the most advantageous location for drilling operations.

The accompanying drawings show one form of exploratory apparatus by which my method of detecting and measuring radiant energy emanating from subterranean deposits of petroleum may be carried out.

Figure 1 is a diagrammatic illustration of one form of apparatus for carrying out the method of my invention.

Figure 2 is a diagrammatic illustration of the same form of apparatus but with different shielding.

Referring to Figure 1, this shows diagrammatically a common gold leaf electroscope shielded on all sides. The shield 1 may be of any particular single, multiple, or combination of metallic, non-metallic, liquid, or gaseous types of construction which shields the ionization chamber 2 and electrode 3 therein from earthly ionizing radiations such as alpha, beta, gamma and unwanted radiations associated with the penetrating radiant energy emanating from subterranean petroleum deposits yet permitting penetration to the ionization chamber 2 of the desired non-ionizing penetrating radiant energy emanating from the subterranean petroleum deposits in sufficient quantity to be detected and measured. If single metallic shielding is to be used, lead may be employed. The electrode 3 is insulated from the ionization chamber walls by the insulator 4 and appended to the electrode 3 is a strip of gold leaf 5. The electrode 3 is charged by means of an insulated wire passed through the opening 10 in shield 1 and to the usual wire means provided in electroscope chambers for charging the electrode by contact. Affixed to the ionization chamber through the front shielding 1 is a microscope in which there is a fixed calibrated scale and the microscope is positioned at right angles to the gold leaf 5 when charged so that the edge of the gold leaf 5 may be viewed through the microscope.

Referring now to Figure 2, this is similarly a diagrammatic illustration of a common gold leaf electroscope, 2' being the ionization chamber, 3' the electrode, 4' the insulator which insulates the electrode from the ionization chamber walls, and 5' a strip of gold leaf appended to the electrode 3'. The electroscope is shielded on all sides. The portions of the bottom shielding numbered 6 have shielding capacity the same as shield 1 and the inner portion of the bottom shielding numbered 8 has shielding capacity the same as shield 1 in Figure 1. The outer shields 6 and 7 shield the ionization chamber 2' and electrode 3' therein against earthly electrical radiation, all or in part, including radiation emanating from subterranean petroleum deposits while the inner portion of the bottom shielding 8 shields from the ionization chamber 2' and electrode 3' therein earthly ionizing radiation, all or in part, such as alpha, beta, gamma and other unwanted radiations including secondary radiations observed associated with the penetrating radiant energy emanating from subterranean deposits of petroleum, which radiation accelerates the discharge of an ionization chamber charge, yet permitting penetration to the ionization chamber 2' of the desired penetrating radiant energy emanating from subterranean deposits of petroleum in sufficient quantity to be detected and measured, which petroleum deposit radiant energy retards the dissipation of decay of an ionization chamber electrode charge when charged with a positive electrostatic charge. The recess 9 in the bottom shielding is directly below the ionization chamber and may be constructed to any desired width. A recess of two inches in diameter has been found to permit sufficient radiation to penetrate to the ionization chamber for good observations in oil fields of small production. The shielding 6 and 7 may be of any particular single, multiple, or combination of metallic, non-metallic, liquid, or gaseous types of construction. If single metallic shielding is to be used, lead may be employed. Affixed to the ionization chamber 2' through the front shield is a microscope in which there is a fixed calibrated scale and this microscope is positioned at right angles to the gold leaf strip 5' when charged so that the edge of the gold leaf strip 5' may be viewed through the microscope. The electrode 3' in Figure 2 is charged the same as described in Figure 1, opening 11 in shield 7 being used for this purpose.

As previously stated, in the absence of radiant energy any charge placed on an electrode in an ionization chamber will dissipate or decay at a rate fixed by and dependant on the construction of the ionization chamber and the insulation around the ionization chamber electrode. That rate of dissipation is called the normal rate of dissipation.

As an essential feature of this invention is the observing of a retardation in the dissipation of an electrode charge over the normal rate of dissipation of an electrode charge in the same ionization chamber, the method of obtaining that normal rate of discharge is explained as follows. The electrode 3 in Figure 1 is given a positive electrostatic charge at point of exploration. When the ionization chamber is shielded against earth electrical radiation and with the ionization chamber 2 shown in Figure 1, the electrode charge will extend the gold leaf strip 5 from the electrode 3. The charge should be of sufficient value to extend the gold leaf strip 5 away from the electrode 3 to a position capable of being observed through the microscope. As the electrode 3 loses its charge or dissipates, the gold leaf strip 5 will descend toward the electrode 3. Observations are made of the time period the gold leaf strip 5 descends toward the electrode 3 over a scale unit in the microscope and of the number of scale units traversed by the gold leaf strip 5 over a definite time period. Those observations are known as the normal rate of dissipation of the electrode charge at point of exploration.

Similarly the normal rate of loss or dissipation of a charge on the inner surface of the ionization chamber 2 is the same rate as that ascertained for the normal rate of dissipation of the electrode charge because when an initial charge is placed on the electrode 3, in accordance with the accepted theory, a corresponding charge of opposite polarity is created on the inner walls of the ionization chamber 2, that is the relationship of the charge on the electrode 3 and the inner walls of the ionization chamber 2 is the same, and as I have learned, adding additional charges to the inner walls of the ionization chamber 2 will correspondingly increase the electrode charge. Likewise any loss of charge on the inner surface of the ionization chamber 2 will cause a corresponding loss of charge on the electrode 3. Therefore the change of the charge on the inner surface of the ionization chamber 2 is represented by the change of charge ascertained when observing the dissipation of the charge on the electrode 3.

When prospecting for subterranean petroleum at locations on the earth's surface employing the exploratory apparatus shown in Figure 1, a positive electrostatic charge is placed on the electrode 3 which charge, in accordance with the accepted theory, causes corresponding negative charges to be created on the inner surface of the ionization chamber 2. The electrode charge also extends the gold leaf strip 5 away from the electrode 3. With this initial electrode charge of sufficient value to permit the gold leaf strip 5 to be observed through the microscope affixed at right angles to the electroscope, the apparatus is set for observations of the rate of dissipation of the electrode charge. With the shielding 1 as previously described, the penetrating radiant energy emanating from the subterranean petroleum deposits will penetrate shield to the ionization chamber 2 and cause additional negative charges to be created on the inner surface of the ionization chamber 2. The additional negative charges thus added to the inner surface of the ionization chamber will cause additional charges of the opposite polarity to be created on the ionization chamber electrode 3. With these additional positive charges created on the ionization chamber electrode 3 the rate of dissipation of the initial electrode charge will be retarded. Observations are made through the microscope of the time period the gold leaf strip 5 descends toward the electrode 3 over a scale unit, the scale being fixed in the microscope, or of the number of scale units traversed by the gold leaf strip 5 over a definite period of time, or both, at the same or different times of making observations at point of exploration. Comparison of the rate of dissipation of the initial electrode charge, when supplemented by the additional positive charges created thereon resulting from the penetration to the ionization chamber 2 of the penetrating radiant energy emanating from subterranean petroleum deposits, with the normal rate of dissipation of an electrode charge in that ionization chamber at point of exploration, is made to determine any retardation in the rate of dissipation of the electrode charge. Any retardation noted therefor determines the presence of subterranean petroleum deposit emanations of sufficient quantity to be detected. In field explorations for the locating of subterranean deposits of petroleum the apparatus is subjected to earthly electrical radiations and if the rate of dissipation of the initial electrode charge is the normal rate of dissipation at point of exploration there has been no penetration to the ionization chamber of penetrating radiant energy emanating from subterranean petroleum deposits in sufficient quantity to be detected.

The extent of the retardation is proportional to the amount of radiant energy emanating from the subterranean petroleum deposit that penetrates to the ionization chamber 2, for the addition of a larger number of negative charges created on the inner surface of the ionization chamber causes a larger addition of positive charges to be created on the positively charged electrode 3 which in turn causes a greater retardation in the dissipation of the electrode charge over its normal rate of dissipation. That is, the time consumed in the dissipation of the electrode charge as indicated by the gold leaf strip 5 in descending a scale unit will increase proportionately to the amount of additional positive charges created on the electrode 3. Observing the extent or amount of this retardation by comparing that time with the time consumed by the gold leaf strip 5 to descend the scale unit when obtaining the normal rate of dissipation and noting the difference in time comprises measuring the penetrating radiant energy emanating from the subterranean petroleum deposit or deposits operating the apparatus at point of exploration. The extent or amount of retardation in the dissipation of the electrode charge is also obtained by comparing the number of scale units the gold leaf strip 5 will descend in a stated period of time, when the apparatus is subjected to earthly electrical radiation, with the number of scale units traversed by the gold leaf strip 5 during the same period of time when its normal rate of dissipation was ascertained at point of exploration, the lesser the number of scale units traversed by the gold leaf strip 5 during the same time period, the greater the retardation in the dissipation of the electrode charge.

When prospecting for subterranean petroleum deposits at locations on the earth's surface, employing apparatus with shielding shown in Figure 2, the operation of the electroscope is the same as when prospecting with shielding described in Figure 1. A positive electrostatic charge is placed on the electrode 3' which charge, in accordance with the accepted theory causes corresponding negative charges to be created on the inner surface of the ionization chamber 2'. The electrode charge also extends the gold leaf strip 5' away from the electrode 3'. With this initial electrode charge of sufficient value to permit the golf leaf strip 5' to be observed through the microscope affixed at right angles to the electroscope, the apparatus is set for observations of the rate of dissipation of the electrode charge. With shielding 6 and 7 shielding the ionization chamber 2' and electrode 3' therein against earthly electrical radiations including the penetrating radiant energy emanating from subterranean deposits of petroleum, the recess 9 and the shielding 8 will permit penetration to the ionization chamber of that portion of the radiant energy emanating from subterranean petroleum deposits that will pass through the recess 9 and through shielding 8 thence to the ionization chamber 2'. With the penetration of such radiant energy to the ionization chamber 2′ additional negative charges will be created on the inner surface of the ionization chamber 2′. The additional negative charges thus created on the inner surface of the ionization chamber 2′ will cause additional positive charges to be created on the ionization chamber electrode 3′.

With these additional positive charges created on the ionization chamber electrode 3′ the rate of dissipation of the initial electrode charge will be retarded. Observations are made through the microscope of the time period the gold leaf strip 5′ descends toward the electrode 3′ over a scale unit, the scale being fixed in the microscope, or of the number of scale units traversed by the gold leaf strip 5′ over a definite period of time, or both, at the same or different times of making observations. Comparison of the rate of dissipation of the initial electrode charge, when supplemented by the additional positive charges created thereon resulting from the penetration to the ionization chamber 2′ of the penetrating radiant energy emanating from subterranean petroleum deposits, with the normal rate of dissipation at point of exploration of an electrode charge in that ionization chamber is made to determine any retardation in the rate of dissipation of the electrode charge.

Any retardation noted therefore determines the presence of subterranean petroleum deposit emanations in sufficient quantity to be detected. In field explorations for the locating of subterranean deposits of petroleum if the rate of dissipation of the initial electrode charge is the normal rate of dissipation at point of exploration there has not been penetration to the ionization chamber of the penetrating radiant energy emanating from subterranean petroleum deposits in sufficient quantity to be detected. If a retardation has been observed that detection of the radiant energy from subterranean petroleum deposits is called a vertical detection because the radiant energy penetrating to the ionization chamber 2′ emanates vertically from the earth through the recess 9 and shielding 8 to the ionization chamber. By the use of bottom shielding constructed with a narrow recess, the radiant energy penetrating to the ionization chamber may be restricted to that energy radiating from a small portion of the subterranean petroleum deposit.

The use of bottom shielding constructed with a recess of different narrow widths is a necessary adjunct to precision detecting for use in geophysical prospecting such as charting the bounds or locating the outer limits of a subterranean petroleum deposit. Detecting the radiant energy with a narrow recess is termed fine point detection or detecting.

When using shielding as shown in Figure 2 measurements of the extent or amount of the penetrating radiant energy emanating from subterranean petroleum deposits that passes through the recess 9 and through the shielding 8 to the ionization chamber 2′ are relative when compared with measurements obtained with shielding shown in Figure 1 because for measurement purposes in Figure 2 only such radiant energy that passes through the recess 9 and the shielding 8 will penetrate to the ionization chamber. The radiant energy that penetrates to the ionization chamber 2′ through recess 9 and shielding 8 will cause negative charges to be created on the inner surface of the ionization chamber which in turn causes additional positive charges to be created on the initially positive charged ionization chamber electrode 3′. The time consumed in the dissipation of the electrode charge as indicated by the gold leaf strip 5′ in descending one scale unit with those additional positive charges created upon it, will increase proportionately to the extent of the radiant energy penetrating to the ionization chamber 2′. Observing the extent or amount of this retardation by comparing that time with the time consumed in the normal rate of dissipation at point of exploration when descending the same scale unit and noting the difference in time comprises measuring the penetrating radiant energy emanating from subterranean petroleum deposits that passes through the recess 9.

Similarly the extent or amount of retardation in the dissipation of the electrode charge may also be obtained by comparing the number of scale units the gold leaf strip 5′ will descend in a stated period of time, when the penetrating radiant energy emanating from subterranean petroleum deposits does penetrate to the ionization chamber 2′, with the number of scale units traversed by the gold leaf strip 5′ during the same period of time when obtaining the normal rate of dissipation at point of exploration and noting the difference which is the amount of retardation in the rate of dissipation of the electrode charge. For example, if the number of scale points traversed by the gold leaf strip 5′ when descending toward the electrode 3′ is 12 points in 20 minutes when obtaining the normal rate of dissipation at point of exploration and the number of points on the fixed scale in the microscope traversed by the gold leaf strip 5′ in 20 minutes when the penetrating radiation emanating from subterranean petroleum deposits does penetrate to the ionization chamber is 5 points, the amount of retardation is represented by 7 points.

Measuring the radiant energy emanating from subterranean petroleum deposits with a narrow recess in the bottom shielding in Figure 2 is termed fine point measuring or measurements. Precision or fine point measurements serve such uses as ascertaining points of maximum radiation from a limited portion of the petroleum deposit to determine the best location for drilling operations.

While I have described my invention and have set forth a few of its uses, this invention is not necessarily limited in all its claims to the examples given.

It is emphatically stated that all metals used in the construction of the apparatus described in this application must be pure, inactive and absolutely free from any entrapped energy or rays of any kind whatever.

What is claimed is:

1. A method of detecting radiant energy for the presence of subterranean petroleum deposits that comprises surrounding an ionization chamber with a shield against earthly ionizing radiation, charging negatively electrostatically the inner surface of said chamber, subjecting said shielded ionization chamber to the radiant energy emanating from subterranean petroleum deposits, determining the rate of change of charge on the inner surface of the ionization chamber and comparing that rate of change of charge with the rate of change of a negative electrostatic charge on the inner surface of the chamber when not subjected to the radiant energy emanating from subterranean petroleum deposits.

2. A method of detecting radiant energy for the presence of subterranean petroleum deposits that comprises surrounding an ionization chamber with a shield against earthly ionizing radiation, charging positively electrostatically an electrode in said chamber thereby causing corresponding negative charges on the inner surface of said chamber, subjecting said shielded chamber to the radiant energy emanating from subterranean petroleum deposits, determining the rate of change of charge on the electrode and comparing that rate of change of charge with the rate of change of a positive electrostatic charge on the electrode when not subjected to the radiant energy emanating from subterranean petroleum deposits.

3. A method for detecting radiant energy for the presence of subterranean petroleum deposits that comprises surrounding an ionization chamber with a shield against earthly ionizing radiation, charging positively electrostatically an electrode in said chamber, subjecting said shielded chamber to the radiant energy emanating from subterranean petroleum deposits, observing the time of dissipation of the electrode charge and comparing that time of dissipation with the time of dissipation of a similar electrode charge when not subjected to the radiant energy emanating from subterranean petroleum deposits.

4. A method of measuring radiant energy for the relative amount of subterranean petroleum deposit emanations encountered in a geophysical exploration that comprises surrounding an ionization chamber with a shield against earthly ionizing radiation, charging positively electrostatically an electrode in said chamber, subjecting said shielded chamber to the radiant energy emanating from subterranean petroleum deposits, observing the change of the electrode charge while dissipating when subjected to the radiant energy emanating from subterranean petroleum deposits, comparing that change of electrode charge with the change of a similar electrode charge when not subjected to the radiant energy emanating from subterranean petroleum deposits, and therefrom determine the relative amount of subterranean petroleum deposit emanations encountered.

5. A method of fine point detecting of subterranean petroleum deposit emanations that comprises surrounding an ionization chamber with a shield against earthly electrical radiation except for a portion of said shield between the chamber and the earth which excepted portion of the surrounding shield shields the ionization chamber from only the earthly ionizing radiation, charging positively electrostatically an electrode in said chamber, subjecting said shielded chamber to the radiant energy emanating from subterranean petroleum deposits, determining the rate of dissipation of the electrode charge, comparing that rate of dissipation with the rate of dissipation of a similar positive electrostatic charge on the electrode when not subjected to the radiant energy emanating from subterranean petroleum deposits, the presence of petroleum deposit emanations encountered from a limited area of the earth's substrata being detected thereby.

6. A method of fine point measuring of radiant energy for the relative amount of subterranean petroleum deposit emanations encountered in geophysical explorations that comprises surrounding an ionization chamber with a shield against earthly electrical radiation except for a portion of said shield between the chamber and the earth which excepted portion of the surrounding shield shields the ionization chamber from only the earthly ionizing radiation, charging positively electrostatically an electrode in said chamber, subjecting said shielded chamber to the radiant energy emanating from subterranean petroleum deposits, observing the change of charge on the electrode and comparing that change of charge on the electrode with the change of a similiar positive electrostatic charge on the electrode when not subjected to the radiant energy emanating from subterranean petroleum deposits, the relative amount of petroleum deposit emanations encountered from a limited area of the earth's substrata being measured thereby.

WALTER ARMSTRONG.

REFERENCES CITED

The following references are of record in the file of this patent:

UNITED STATES PATENTS

| Number | Name | Date |
| --- | --- | --- |
| 1,933,063 | Kolhorster | Oct. 31, 1933 |

FOREIGN PATENTS

| Number | Country | Date |
| --- | --- | --- |
| 340,231 | Great Britain | Dec. 12, 1930 |
| 576,338 | Germany | May 11, 1933 |